US010742758B2

(12) United States Patent
Yoshida (10) Patent No.: US 10,742,758 B2
(45) Date of Patent: Aug. 11, 2020

(54) COMMUNICATION ANALYSIS DEVICE, COMMUNICATION ANALYSIS METHOD, AND PROGRAM RECORDING MEDIUM (71) Applicant: NEC Corporation, Tokyo (JP)

(72) Inventor: Hiroshi Yoshida, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 175 days.

(21) Appl. No.: 16/078,216

(22) PCT Filed: Mar. 8, 2017

(86) PCT No.: PCT/JP2017/009206
§ 371 (c)(1),
(2) Date: Aug. 21, 2018

(87) PCT Pub. No.: WO2017/159490
PCT Pub. Date: Sep. 21, 2017

(65) Prior Publication Data
US 2019/0089795 A1 Mar. 21, 2019

(30) Foreign Application Priority Data
Mar. 16, 2016 (JP) ................................ 2016-052729

(51) Int. Cl.
G06F 15/16 (2006.01)
H04L 29/08 (2006.01)
(Continued)

(52) U.S. Cl.
CPC .......... H04L 67/22 (2013.01); G06F 16/9535 (2019.01); G06F 17/18 (2013.01);
(Continued)

(58) Field of Classification Search
CPC ..... H04L 67/22; H04L 67/146; H04L 67/306; G06F 16/9535; G06F 17/18; G06Q 10/0639; G06Q 30/0201
See application file for complete search history.

(56) References Cited

U.S. PATENT DOCUMENTS 7,143,184 B1 * 11/2006 Shah .................. H04L 41/5009
709/241
8,346,709 B2 * 1/2013 Silverman ............. G06Q 30/02
705/14.49
9,178,950 B2 * 11/2015 Kansky ................ G06F 3/0481
9,826,052 B2 * 11/2017 Zong ..................... H04L 67/02
(Continued)

FOREIGN PATENT DOCUMENTS

JP 2005-110209 A 4/2005
JP 2015-195530 A 11/2015

OTHER PUBLICATIONS

Written Opinion of the International Searching Authority of PCT/JP2017/009206 dated Jun. 6, 2017.
International Search Report of PCT/JP2017/009206 dated Jun. 6, 2017.

Primary Examiner — Moustafa M Meky
(74) Attorney, Agent, or Firm — Sughrue Mion, PLLC (57) ABSTRACT A communication analysis device updates statistical information on a content access based on the communication session log of a user. The content access is an aggregation of a plurality of communication sessions needed for browsing one website. The communication analysis device acquires session information pertaining to one communication session, and determines whether a lapsed time from the start time or end time of a base communication session to the start time or end time of the one communication session is equal to or less than a threshold value. When the lapsed time is equal to or less than the threshold value, the communication analysis device determines that the one communication session is included in the same content access as the base communication session, and updates the statistical informa-
(Continued)

tion of the content access. The communication analysis device stochastically sets the threshold value based on a prescribed probability distribution.

7 Claims, 9 Drawing Sheets

(51) Int. Cl.
    *G06F 16/9535* (2019.01)
    *G06F 17/18* (2006.01)
    *G06Q 30/02* (2012.01)
    *G06Q 10/06* (2012.01)

(52) U.S. Cl.
    CPC ..... *G06Q 10/0639* (2013.01); *G06Q 30/0201* (2013.01); *H04L 67/146* (2013.01); *H04L 67/306* (2013.01)

(56) References Cited

U.S. PATENT DOCUMENTS

| | | | |
|---|---|---|---|
| 10,587,707 B2 * | 3/2020 | Qu | H04L 43/04 |
| 2008/0009311 A1 * | 1/2008 | Nam | G06F 3/0481 |
| | | | 455/550.1 |
| 2010/0198772 A1 * | 8/2010 | Silverman | G06Q 30/02 |
| | | | 706/52 |
| 2013/0339241 A1 * | 12/2013 | Knight | G06Q 20/405 |
| | | | 705/44 |
| 2014/0379429 A1 * | 12/2014 | Valimaki | G06Q 30/0204 |
| | | | 705/7.33 |
| 2014/0379841 A1 * | 12/2014 | Zong | H04L 67/02 |
| | | | 709/213 |
| 2016/0267499 A1 * | 9/2016 | Valimaki | G06Q 30/0204 |

* cited by examiner

Fig. 9

COMMUNICATION ANALYSIS DEVICE, COMMUNICATION ANALYSIS METHOD, AND PROGRAM RECORDING MEDIUM

CROSS REFERENCE TO RELATED APPLICATIONS

This application is a National Stage of International Application No. PCT/JP2017/009206 filed Mar. 8, 2017, claiming priority based on Japanese Patent Application No. 2016-052729 filed Mar. 16, 2016, the disclosure of which is incorporated herein in its entirety by reference.

TECHNICAL FIELD

The present invention relates to a communication analysis device, a communication analysis method and a communication analysis program which are for analyzing a user's communication session log.

BACKGROUND ART

In general, a website is configured in a large number of contents including text, script, images, videos and the like. Accordingly, when a user browses the website using a communication terminal, communication for acquiring all of the contents constituting the website needs to be performed. HTTP (Hypertext Transfer Protocol) is often used as communication for acquiring website contents, where a communication terminal performs the same number of HTTP communications as the number of contents.

For example, when a website consists of one piece of text, one piece of script and two images and a communication terminal needs to acquire and display all of the contents of the website, it is required for the communication terminal to perform HTTP communication four times. A series of communication steps including those for transmission of a content request, reception of the content and the like performed in one communication is referred to as a session. Thus, to browse one website, a plurality of times of HTTP sessions need to be performed. Hereafter, a plurality of times of HTTP sessions necessary for browsing one website are collectively referred to as one content access.

Meanwhile, as a method for evaluating Quality of Experience (QoE: The degree of delight or annoyance of a user's experiences) of content access, a node in a network accumulates a user's communication sessions as a log and analyzes the communication session log. A representative example of QoE evaluation is evaluation of a necessary time for content access (specifically, a time since a website is accessed until the website is displayed or until acquisition of all contents of the website is completed). Hereafter, the necessary time for content access is referred to as a content access time.

The communication session log is recorded in terms of each session (each HTTP session, in a case of HTTP communication). Specifically, information on such as a communication start time, a communication end time, an address, a content type and a URL is recorded. However, it is difficult to infer, from the log, which HTTP session is that which constitutes a specific website. To trace a corresponding website from a HTTP session, it is necessary to store substance of the contents (substance of HTML or script), but such storage is difficult practically because a data size of the log becomes enormous.

Patent Literature 1 (PTL 1) discloses a communication operation analysis apparatus which aggregates, of the same user, HTTP sessions whose elapsed time since a reference HTTP session is equal to or less than a predetermined threshold value.

CITATION LIST

Patent Literature

[PTL 1] Japanese Patent Laid-Open No. 2015-195530

SUMMARY OF INVENTION

Technical Problem

In PTL 1, HTTP sessions having occurred within a predetermined time period (predetermined threshold value) after a base HTTP session was started are aggregated together as one bulk, where a time associated with the bulk strongly depends on the threshold value. For example, when the threshold value is set at 3 seconds, a distribution probability of a time associated with a bulk extremely increases near 3 seconds and, on the other hand, when the threshold value is set at 5 seconds, the distribution probability shows an increase near 5 seconds.

However, even when QoE is evaluated by regarding such a time associated with a bulk as a content access time, QoE cannot be statistically evaluated with high accuracy because, depending on how the threshold value is set, there may occur a bias in distribution of the content access time.

A primary objective of the present invention is to provide a technology for evaluating QoE with high accuracy.

Solution to Problem

A communication analysis device of an example embodiment is configured as follows. That is, the communication analysis device updates statistical information about a content access equivalent to an aggregation of a plurality of communication sessions necessary for browsing one website based on a communication session log related to a user, and includes:

an aggregation unit that acquires session information on a communication session, and when an elapsed time since a start or end time of a base communication session until a start time of the communication session is equal to or less than a threshold value, determines that the communication session is to be included in the same content access as that of the base communication session and updates the statistical information on the content access; and a stochastic threshold value setting unit that sets stochastically a threshold value based on a predetermined probability distribution.

A communication analysis method of an example embodiment is configured as follows. That is, the communication analysis method includes updating statistical information about a content access equivalent to an aggregation of a plurality of communication sessions necessary for browsing one website based on a communication session log related to a user, and further includes:

stochastically setting a threshold value based on a predetermined probability distribution; and acquiring session information on a communication session, and when an elapsed time since a start or end time of a base communication session until a start time of the communication session is equal to or less than a threshold value, determining that the communication session is to be included in the same content access as that of the base communication session and updating statistical information on the content access.

A program recording medium of an example embodiment stores a computer program as follows. The computer program is a communication session log analysis program for causing a computer to update statistical information about a content access equivalent to an aggregation of a plurality of communication sessions necessary for browsing one website based on a communication session log related to a user. And the computer program causes a computer to execute:

acquiring session information on a communication session, and when an elapsed time since a start or end time of a base communication session until a start time of the communication session is equal to or less than a threshold value, determining that the communication session is to be included in the same content access as that of the base communication session and updating statistical information on the content access; and setting stochastically the threshold value based on a predetermined probability distribution.

Advantageous Effects of Invention

The present invention enables accurate evaluation of QoE.

EXAMPLE EMBODIMENT

An example embodiment of the present invention will be described below, with reference to drawings.

Figure 1:
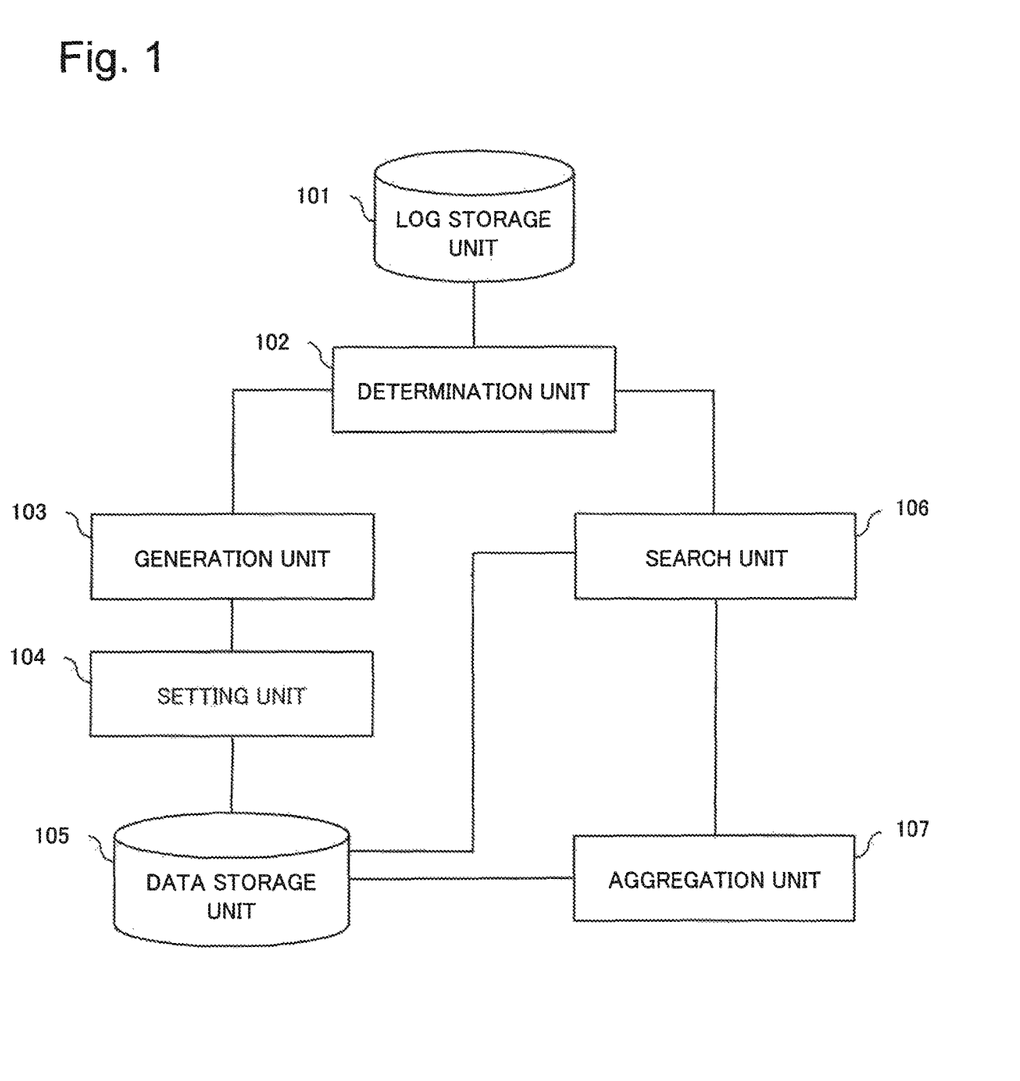
FIG. 1 is a block diagram showing a configuration of an example embodiment of a communication analysis device according to the present invention.

FIG. 1 is a block diagram showing a configuration of a communication analysis device of the present example embodiment. The communication analysis device of the present example embodiment includes a log storage unit 101, a determination unit 102, a generation unit 103, a setting unit 104, a data storage unit 105, a search unit 106 and an aggregation unit 107. The communication analysis device of the present example embodiment analyzes a communication session log stored in the log storage unit 101.

The log storage unit 101 accumulates session information in terms of each communication session (HTTP session) as a communication session log. The session information includes, specifically, a session start time (transmission start time), a session end time (reception completion time), a content type (such as text or html, image or jpeg), a requester's IP (Internet Protocol) address (IP address of the terminal), a UA (User Agent), a URL (Uniform Resource Locator), a content size, and the like.

The determination unit 102 acquires, from the log storage unit 101, the session information on the communication session (HTTP session) as a communication session log. When the content type of the HTTP session is text or html, the determination unit 102 determines that the HTTP session is associated with a new content access, accordingly determines the HTTP session to be a base HTTP session, and hands over the process to the generation unit 103. If determining that the content type does not correspond to a new content access, the determination unit 102 hands over the process to the search unit 106.

The generation unit 103 generates initial data of content access data in which information about the new content access is aggregated, and stores the content access data into the data storage unit 105.

The data storage unit 105 stores content access data.

The setting unit 104 sets a threshold value of a time interval between HTTP sessions, which is used for determination by the aggregation unit 107 when aggregating HTTP sessions, according to a predetermined probability distribution.

The search unit 106 searches for the content access data including the same IP address as a requester's IP address (terminal IP address) of the HTTP session, from the data storage unit 105.

The aggregation unit 107 acquires the session information on the HTTP session to be processed, and determines whether to aggregate the HTTP session into the content access data retrieved by the search unit 106 and, if determining to aggregate, updates the content access data. Specifically, the aggregation unit 107 determines whether an elapsed time Tk since a start or end time of the base HTTP session until a start time of the HTTP session to be processed is equal to or less than a threshold value P. Accordingly, if the elapsed time Tk is equal to or less than the threshold value P, the aggregation unit 107 determines that the HTTP session to be processed and the base HTTP session are included in the same content access, and updates statistical information included in the content access data stored in the data storage unit 105.

Figure 2:
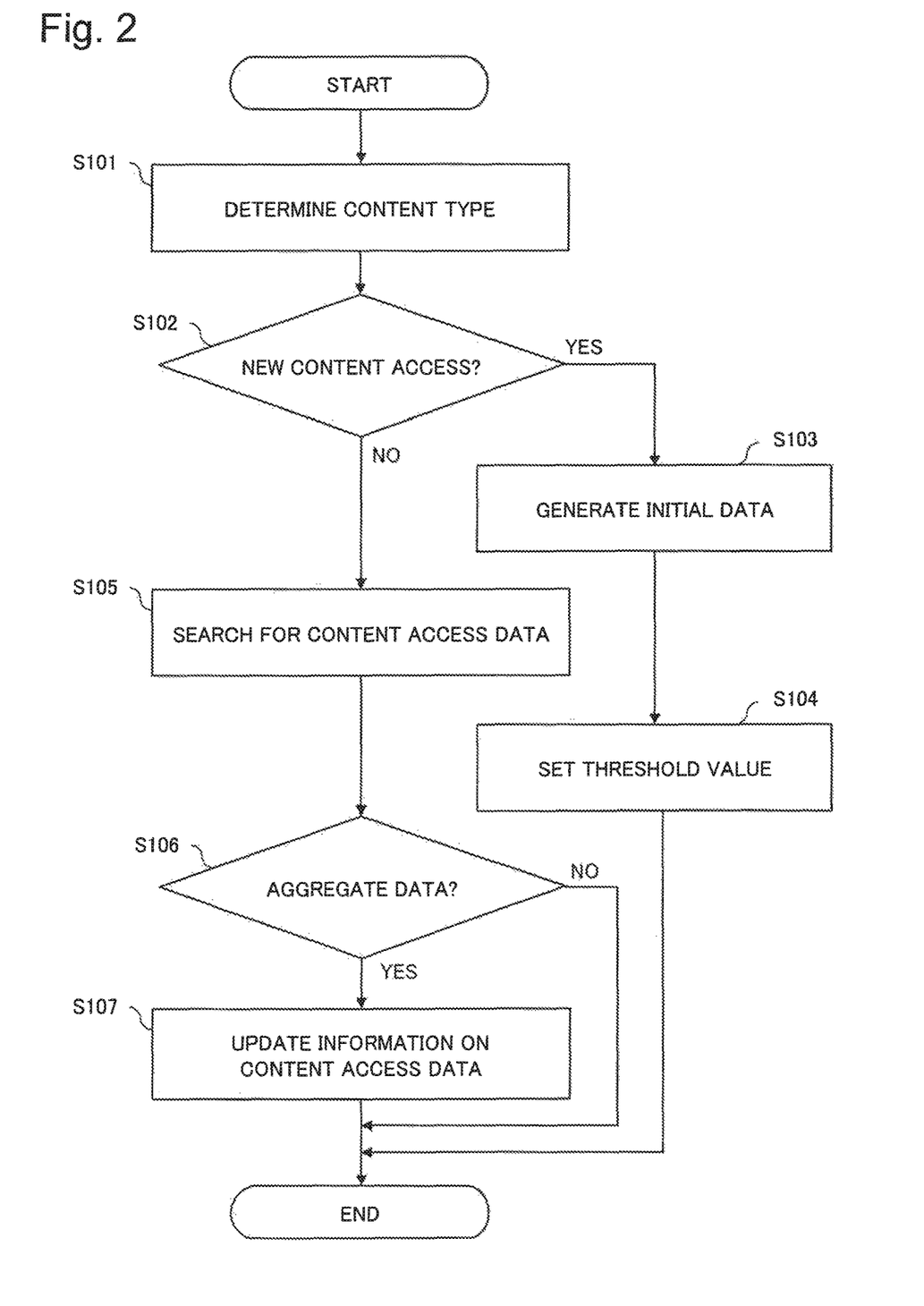
FIG. 2 is a flow chart showing an example of operation of the example embodiment of a communication analysis device according to the present invention.

FIG. 2 is a flow chart showing an example of operation of the communication analysis device according to the present example embodiment. The determination unit 102 acquires the session information on the communication session (HTTP session), as the communication session log, from the log storage unit 101. The determination unit 102 determines the content type of the HTTP session (step S101). According to the content type, the determination unit 102 determines whether to hand over the process to the generation unit 103 or to the search unit 106.

Specifically, if determining that the content type corresponds to the new content access (YES at the step S102), the determination unit 102 hands over the process to the generation unit 103. The determination unit 102 determines the HTTP session to correspond to the new content access if determining that the HTTP session is the first HTTP session in one content access (access to one website). For example, when the content type of the HTTP session is "text or html", the determination unit 102 determines the HTTP session to be the first communication session in the one content access. It is because most websites are generated taking "text or html" as the base.

If determining that the HTTP session is the second or later communication session in the one content access (NO at the step S102), the determination unit 102 hands over the process to the search unit 106. When, as described above, it determines an HTTP session with the content type "text or html" to be the first HTTP session in the one content access, the determination unit 102 determines the HTTP session with the content type other than "text or html" to be the second or later HTTP session, and hands over the process to the search unit 106.

The generation unit 103 generates the initial data of content access data in which information about the new content access is aggregated, and stores the generated data into the data storage unit 105 (step S103). By a process described later, the content access data becomes information in which a plurality of HTTP sessions are aggregated as one content access. The generation unit 103 generates the initial data of content access data taking as the base HTTP session the HTTP session having been determined to be the first HTTP session in the one content access (access to the one website).

The content access data includes information on such as the content access start time (the start time of the first HTTP session), the content access end time (the latest one of end times of aggregated HTTP sessions), the IP address of the terminal having made the content access, the UA of a terminal application having made the content access, the URL of the content access, the content size (a total size of contents acquired by aggregated HTTP sessions), the number of aggregated HTTP sessions, and a time interval threshold value described later. Aggregation of HTTP sessions will be described later as a process performed by the aggregation unit 107.

The setting unit 104 sets a threshold value P of the time interval between HTTP sessions according to a predetermined probability distribution (step S104). The threshold value P is used when the aggregation unit 107 determines whether to aggregate the HTTP session into target content access data.

When the HTTP session has been determined to be the second or later HTTP session in a content access (NO at the step S102), the search unit 106 searches for the content access data with the same IP address as the requester's IP address (terminal IP address) of the HTTP session, from the data storage unit 105 (step S105).

The aggregation unit 107 acquires the session information on the HTTP session to be processed and determines whether to aggregate the HTTP session into the content access data retrieved by the search unit 106 (step S106). Specifically, the aggregation unit 107 determines whether an elapsed time Tk since the start or end time of a base HTTP session in the retrieved content access data until the start time of the HTTP session to be processed is equal to or less than the threshold value P which was stochastically set by the setting unit 104. When the elapsed time Tk is equal to or less than the threshold value P, the aggregation unit 107 determines to aggregate the HTTP session to be processed into the retrieved content access data.

When having determined to aggregate the HTTP session into the content access data (YES at the step S106), the aggregation unit 107 updates information on the end time, the content size, the number of aggregated HTTP sessions and the like in the content access data (step S107). Further, if the end time of the HTTP session to be currently aggregated is later than an end time in the content access data before the current aggregation, the aggregation unit 107 updates the end time in the content access data with the end time of the HTTP session. Further, the aggregation unit 107 increments the content size by that of the HTTP session to be currently aggregated. The aggregation unit 107 also increments the number of aggregated HTTP sessions by 1.

When having determined not to aggregate the HTTP session to be processed into the retrieved content access data (NO at the step S106), the aggregation unit 107 does not update the content access data.

When the search unit 106 has retrieved a plurality of pieces of content access data, the aggregation unit 107 determines whether to perform aggregation, in ascending or descending order of start times of the plurality of pieces of retrieved content access data, in a similar way to that described above. In that case, when it has aggregated the HTTP session to be processed into one of the pieces of content access data, the aggregation unit 107 does not aggregate the HTTP session into any other one of the pieces of content access data.

Figure 8:
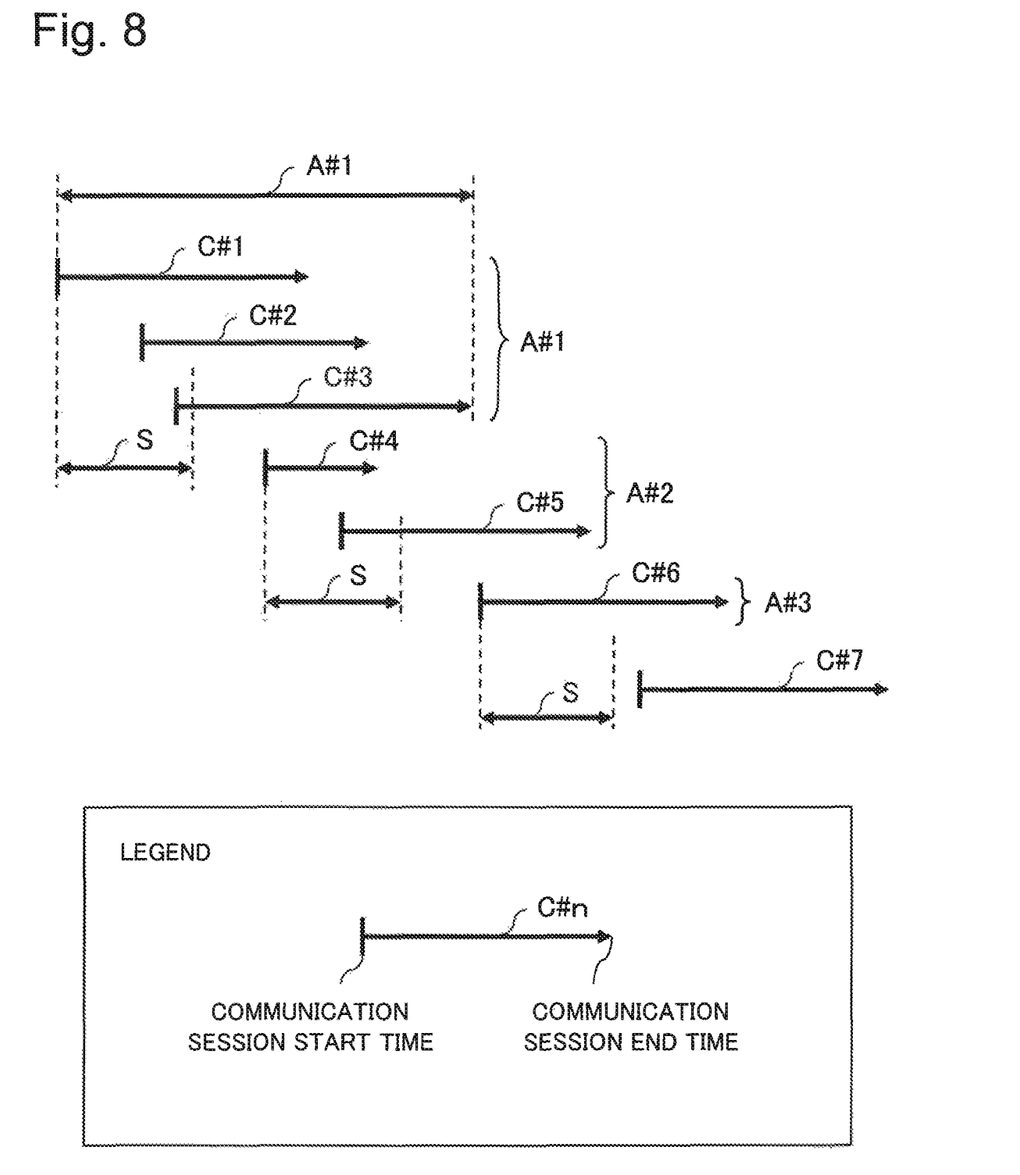
FIG. 8 is a diagram for explaining an example of a method for aggregating HTTP sessions based on a fixed threshold value.

FIG. 8 is a diagram for explaining a method for aggregating HTTP sessions based on a fixed threshold value. In such an aggregation method based on the fixed threshold value, whether to aggregate the communication session is determined every time with reference to the same threshold value. In an example shown in FIG. 8, the communication sessions started within the fixed time interval (fixed threshold value S) are determined to be included in one content access. In the example shown in FIG. 8, communication sessions C #1 to C #3 are determined to be included in a content access A #1. Further, communication sessions C #4 and C #5 are determined to be included in a content access A #2, and a communication session C #6 to be in a content access A #3.

Figure 3:
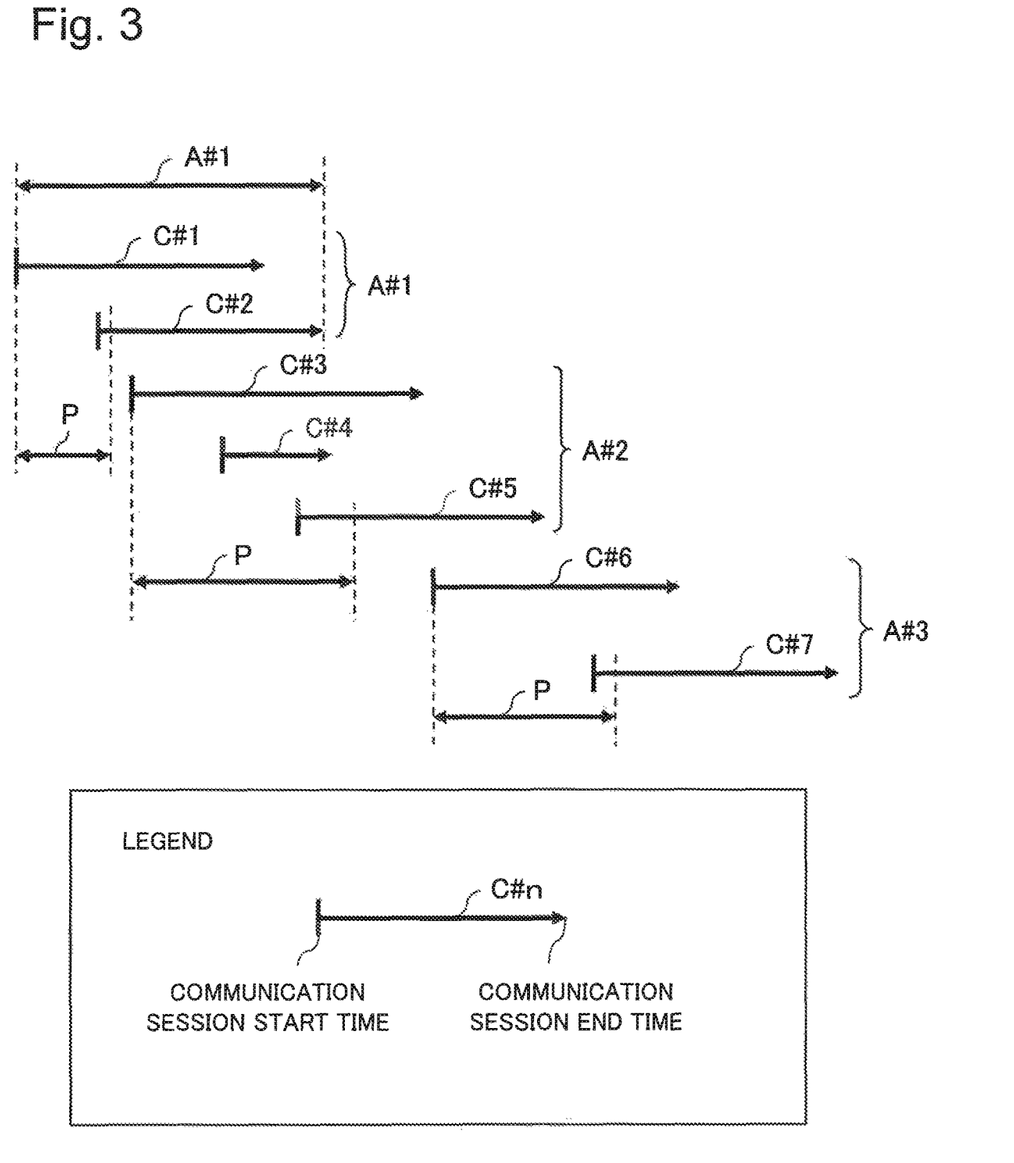
FIG. 3 is a diagram for explaining an example of a method for aggregating HTTP sessions based on stochastic threshold values.

FIG. 3 is a schematic diagram showing a method for aggregating the HTTP sessions based on stochastic threshold values. In such a case of using the stochastic threshold values, threshold values are determined to be different values for respective content accesses according to a predetermined probability distribution. In the present case, the communication sessions C #1 and C #2 are determined to be included in the content access A #1, the communication sessions C #3 to C #5 to be in the content access A #2, and the communication sessions C #6 and C #7 to be in the content access A #3.

<Regarding Stochastic Threshold Values>

As a probability distribution used for setting the stochastic threshold values (threshold values P), the setting unit 104 may use an appropriate one of probability distributions such as a uniform distribution, a beta distribution, a normal distribution, a gamma distribution, an exponential distribution and a Weibull distribution. The distribution of stochastic threshold values has a large influence on statistics of the necessary time for content access (a time since the start time of the content access to the end time), which is a main factor of QoE. To calculate a time close to an actual necessary time for content access, the probability distribution is desired to be that which satisfies characteristics described below.

Characteristic (1): The probability distribution has a probability density function, and is continuous in a domain of definition.

Having this characteristic, the probability distribution becomes a smooth cumulative distribution and, accordingly, a distribution of necessary times for content access is prevented from being of a distorted shape. The probability distributions listed above have this characteristic.

Characteristic (2): The density function has a compact support.

This characteristic guarantees that a distribution range of threshold values becomes a closed and bounded set. Accordingly, threshold values can be prevented from being excessively large. For example, a normal distribution has no compact support, thus the threshold value possible to be selected extends to the infinite. Therefore, when the threshold value becomes excessively large, aggregation is made concentratedly into content access data for which the excessively large threshold value is set, and it accordingly is impossible to measure a normal necessary time for content access. A method in which the threshold values are selected according to a probability distribution having no compact support and, if becoming excessively large, are reselected may be used. But, in that case, an undesirable characteristic occurs. The undesirable characteristic is a characteristic such as that the threshold values do not follow the original probability distribution and a probability distribution of the threshold values becomes discontinuous.

Characteristic (3): The probability density function converges to zero at an end point of the support.

Even when the distribution of threshold values has the compact support, if the distribution does not converge to zero at the end point of the support, such as in a case of a uniform distribution, the distribution of necessary times for content access becomes distorted at the end point of the support. It can be prevented by selecting a probability distribution which converges to zero at the end point of the support.

Figure 4:
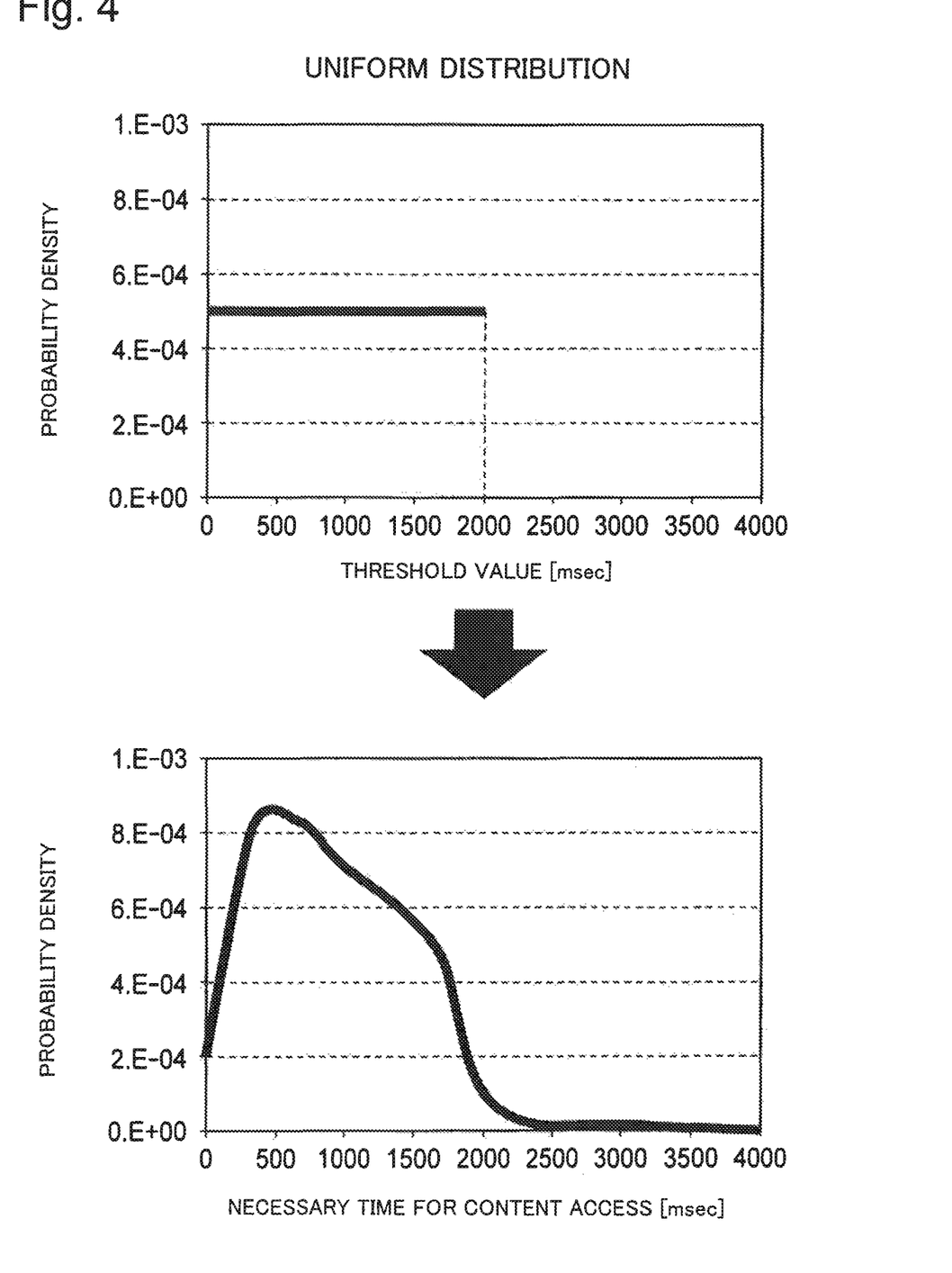
FIG. 4 is a diagram for explaining necessary content access times when using stochastic threshold values of a uniform distribution.
Figure 5:
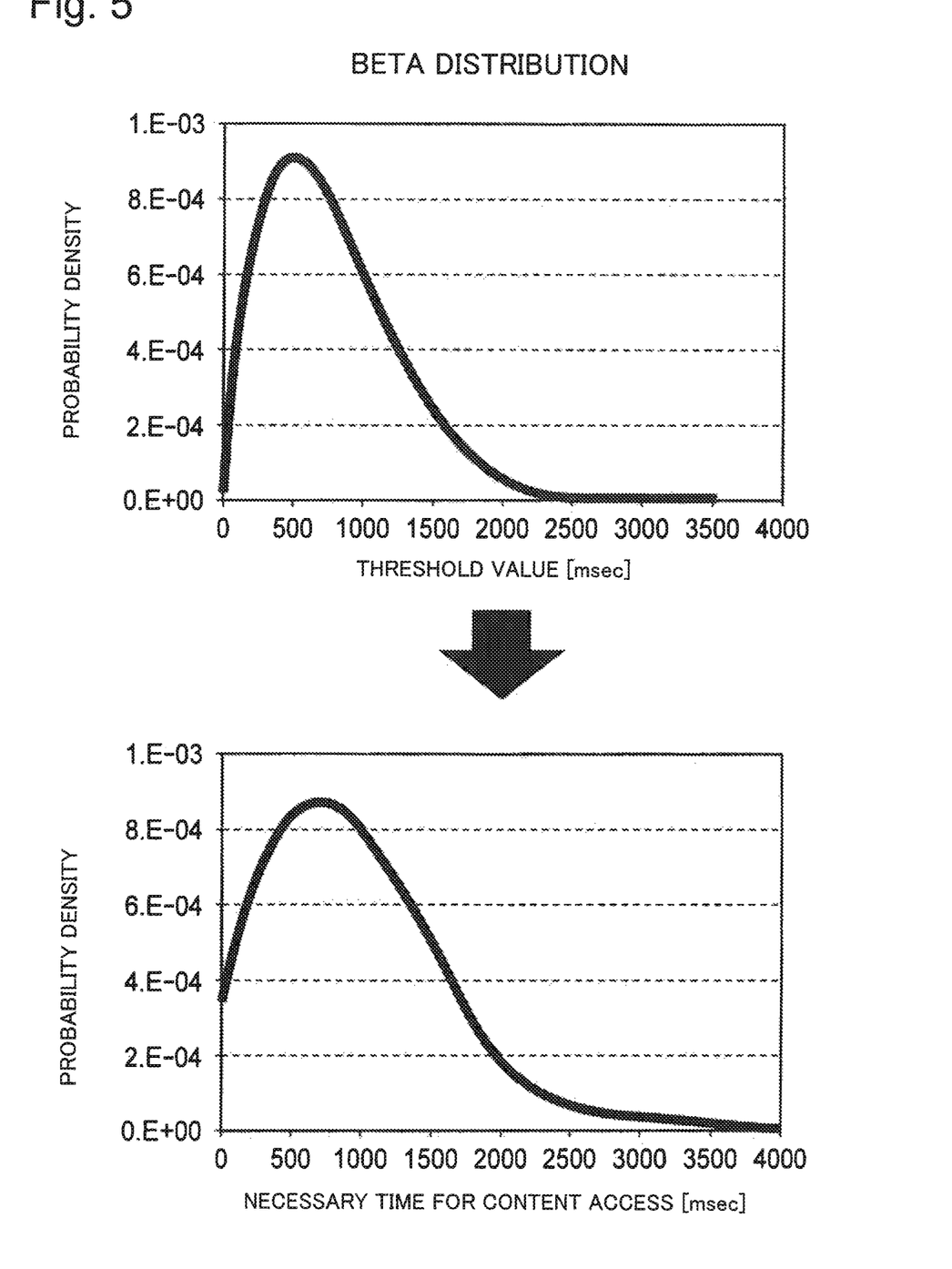
FIG. 5 is a diagram for explaining necessary content access times when using stochastic threshold values of a beta distribution.
Figure 6:
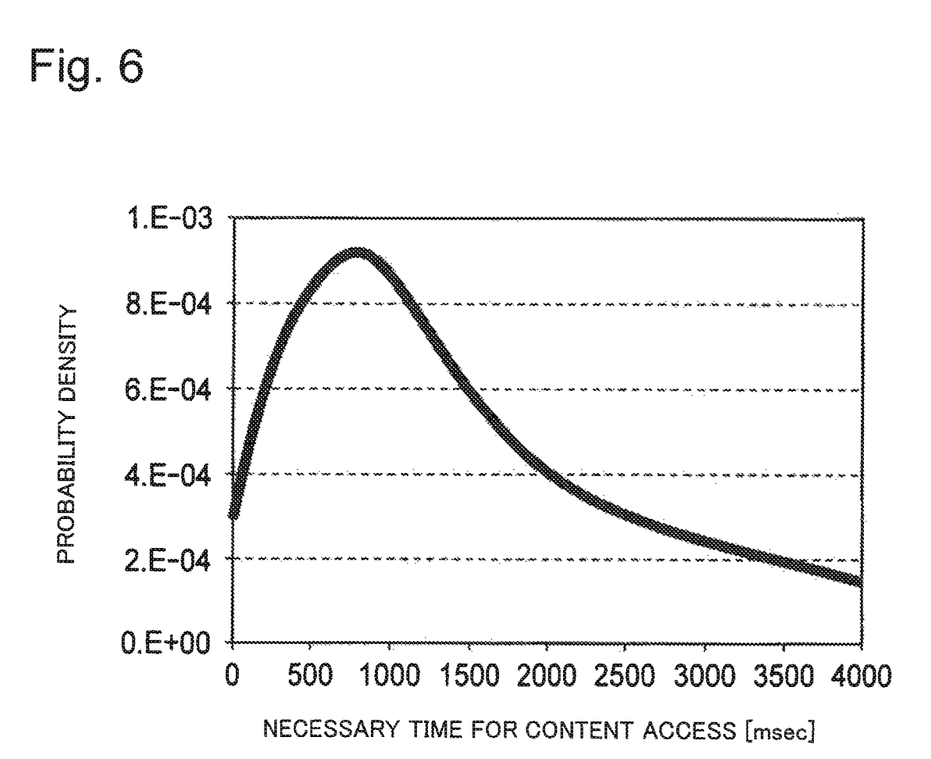
FIG. 6 is a diagram for explaining actual necessary content access times.
Figure 9:
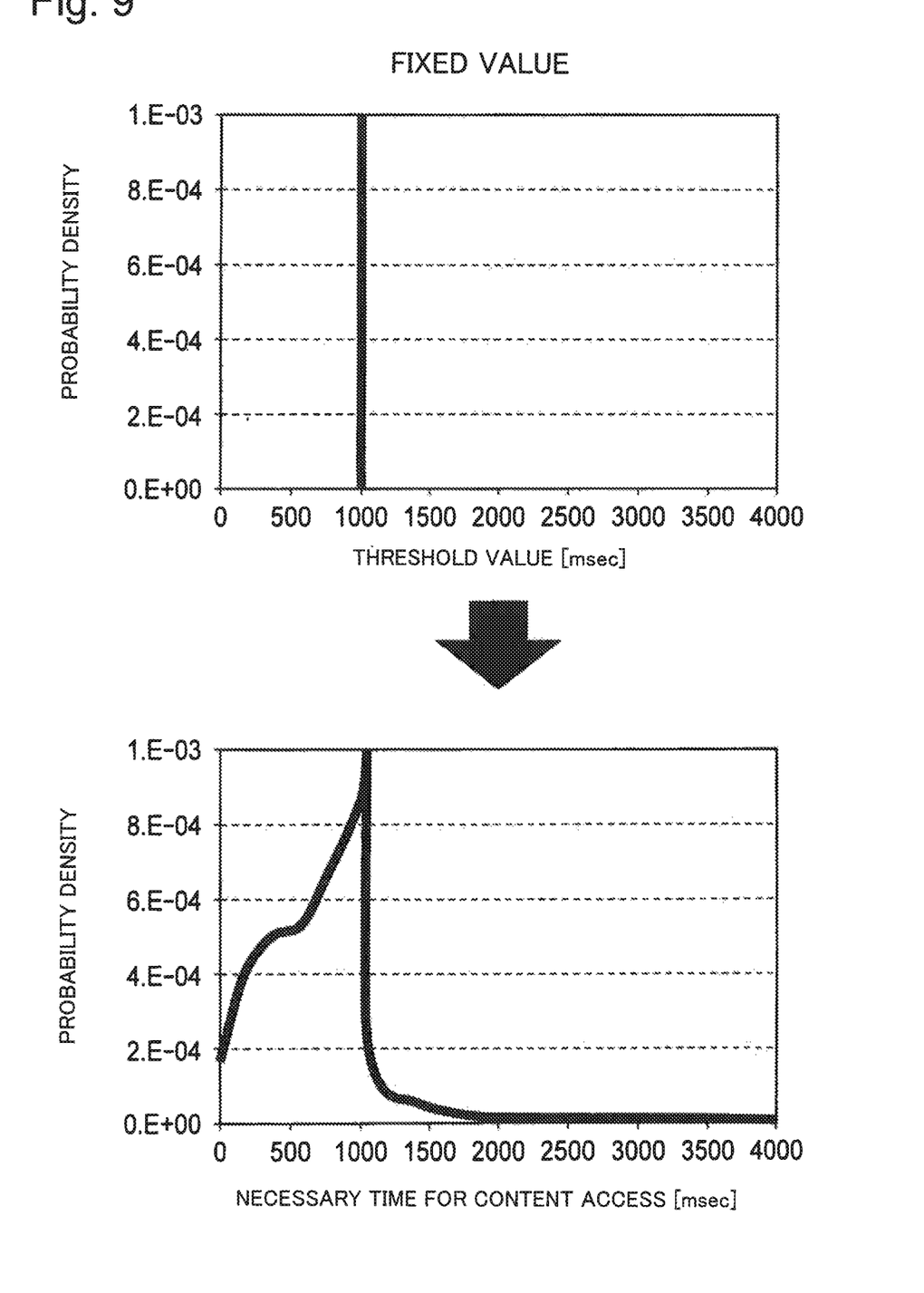
FIG. 9 is a diagram for explaining a necessary content access time when using a fixed threshold value.

FIG. 9 is a diagram for explaining necessary content access times in a case of using the fixed threshold value. FIG. 9 shows an example in which the threshold value is set at the fixed value (one second). FIG. 4 is a diagram for explaining necessary content access times when using the stochastic threshold values of the uniform distribution. FIG. 4 shows an example in which a probability distribution follows the uniform distribution between zero and two seconds. FIG. 5 is a diagram for explaining the necessary content access times when using the stochastic threshold values of a beta distribution. FIG. 5 shows an example in which a probability distribution follows the beta distribution with a support of 3.5 seconds length. FIG. 6 is a diagram for explaining actual necessary content access times. All of the above-described distributions of threshold values have an expectation value equal to 1. In FIGS. 9, 4 and 5, the upper graph shows a distribution of threshold values, and the lower graph shows a distribution of necessary content access times associated with the distribution of threshold values.

When the threshold value is fixed (FIG. 9), the necessary content access times have a peak at around the threshold value, which clearly indicates that the necessary content access times are determined by the fixed threshold value.

When the threshold values follow the uniform distribution (FIG. 4), generation of such a peak as that in the fixed value case is suppressed, but the distribution of necessary content access times becomes not smooth at 2 seconds which is the end point of the support.

In contrast, when the threshold values follow the beta distribution (FIG. 5), the necessary content access times come to have a distribution which smoothly continues to the tail (the distant region on the right side of the distribution), and the distribution is close to that of actual necessary content access times (FIG. 6).

In the above-described way, by performing content access aggregation based on the threshold values which are set stochastically, the communication analysis device of the present example embodiment can obtain a distribution of necessary content access times which is close to that of actual necessary content access times, from a communication session log. As a result, the communication analysis device can perform evaluation of QoE more accurately.

The communication analysis device of the present example embodiment is implemented in a computer. Specifically, the communication analysis device is stored in the form of a program in an auxiliary storage device. The auxiliary storage device is a non-transitory physical media. A CPU (Central Processing Unit) installed in the computer reads the program from the auxiliary storage device, develops the program into a main storage device, and executes processes according to the program.

Figure 7:
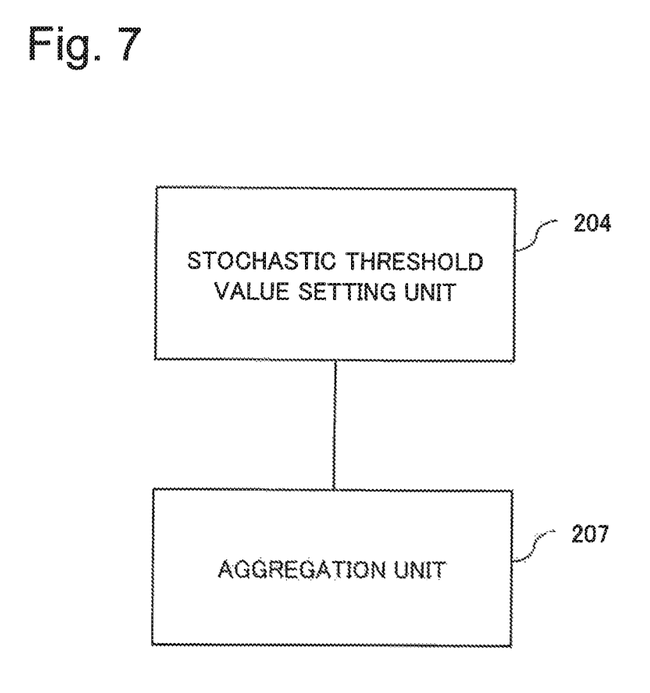
FIG. 7 is a block diagram showing a configuration of a main part of the communication analysis device according to the present invention.

FIG. 7 is a block diagram showing a configuration of a main part of the communication analysis device according to the present example embodiment. The communication analysis device according to the present example embodiment updates statistical information about a content access based on a communication session log related to a user. The content access is an aggregation of a plurality of communication sessions necessary for browsing one website. The main part of the communication analysis device includes a stochastic threshold value setting unit 204 and an aggregation unit 207. The aggregation unit 207 acquires session information on a communication session, and determines whether an elapsed time since a start or end time of a base communication session until a start time of the communication session is equal to or less than a threshold value. When the elapsed time is equal to or less than the threshold value, the aggregation unit 207 determines that the communication session is to be included in the same content access as that of the base communication session, and updates the statistical information on the content access. The stochastic threshold value setting unit 204 stochastically sets the threshold value used by the aggregation unit 207 based on a predetermined probability distribution.

Further, in the example embodiment described above, a communication analysis device described in (1) to (5) below is also disclosed.

(1) In a communication analysis device for updating statistical information about a content access, which is an aggregation of a plurality of communication sessions necessary for browsing one website based on a communication session log of a user, the communication analysis device includes:

an aggregation unit (for example, the aggregation unit 107) configured to acquire the session information on a communication session, and if an elapsed time since a start or end time of a base communication session until a start time of the communication session is equal to or less than a threshold value, determine that the communication session is to be included in the same content access as that of the base communication session and update statistical information on the content access; and a stochastic threshold value setting unit (for example, the setting unit 104) configured to stochastically set the threshold value based on a predetermined probability distribution.

(2) The communication analysis device may be configured such that a probability density function of a probability distribution of threshold values is continuous and has a compact support. According to such the communication analysis device, it is possible to inhibit a distribution of necessary times for content access from being of a distorted shape and to prevent the threshold value from being excessively large.

(3) The communication analysis device may be configured such that values of the probability density function converge to zero at an end point of the support of the probability distribution of threshold values. According to such a communication analysis device, it is possible to prevent the distribution of necessary times for content access from being distorted at an end point of the support.

(4) The communication analysis device may be configured to include a content type determination unit (for example, the determination unit 102) configured to determine a base communication session according to a content type.

(5) The communication analysis device may be configured such that, when the content type of the communication session is text or html, the content type determination unit (for example, the determination unit 102) determines the communication session to be a base communication session.

As above, the present invention has been described taking the above-described example embodiment as an exemplary example. However, the present invention is not limited to the above-described example embodiment. That is, to the present invention, various aspects which can be understood by those skilled in the art may be applied within the scope of the present invention.

INDUSTRIAL APPLICABILITY

The present invention is applicable to analysis of a communication session log.

REFERENCE SIGNS LIST 101 log storage unit
102 determination unit
103 generation unit
104 setting unit
105 data storage unit
106 search unit
107 aggregation unit
204 stochastic threshold value setting unit
207 aggregation unit

The invention claimed is:

1. A communication analysis device to update statistical information about a content access equivalent to an aggregation of a plurality of communication sessions necessary for browsing one website based on a communication session log related to a user, the communication analysis device comprising:
a processor configured to:
acquire session information on a communication session, and when an elapsed time since a start or end time of a base communication session until a start time of the communication session is equal to or less than a threshold value, determine that the communication session is to be included in the same content access as that of the base communication session and update the statistical information on the content access; and
set stochastically a threshold value based on a predetermined probability distribution.

2. The communication analysis device according to claim 1, wherein a probability density function of a probability distribution related to the threshold value is continuous and has a compact support.

3. The communication analysis device according to claim 2, wherein values of the probability density function converge to zero at an end point of the support of the probability distribution related to the threshold value.

4. The communication analysis device according to claim 1, the processor is configured to determine the base communication session according to a content type.

5. The communication analysis device according to claim 4, wherein when the content type of the communication session is text or html, the processor determines the communication session to be the base communication session.

6. A communication analysis method for updating statistical information about a content access equivalent to an aggregation of a plurality of communication sessions necessary for browsing one website based on a communication session log related to a user, the communication analysis method comprising:
stochastically setting a threshold value based on a predetermined probability distribution; and
acquiring session information on a communication session, and when an elapsed time since a start or end time of a base communication session until a start time of the communication session is equal to or less than a threshold value, determining that the communication session is to be included in the same content access as that of the base communication session and updating statistical information on the content access.

7. A non-transitory program recording medium storing a computer program, the computer program being a communication session log analysis program for causing a computer to update statistical information about a content access equivalent to an aggregation of a plurality of communication sessions necessary for browsing one website based on a communication session log related to a user, the computer program causing a computer to execute:
acquiring session information on a communication session, and when an elapsed time since a start or end time of a base communication session until a start time of the communication session is equal to or less than a threshold value, determining that the communication session is to be included in the same content access as that of the base communication session and updating statistical information on the content access; and
setting stochastically the threshold value based on a predetermined probability distribution.

* * * * *